US011942261B2

(12) United States Patent
Yamakita

(10) Patent No.: US 11,942,261 B2
(45) Date of Patent: Mar. 26, 2024

(54) COMMON-MODE CHOKE COIL AND METHOD OF MANUFACTURING COMMON-MODE CHOKE COIL

(71) Applicant: Murata Manufacturing Co., Ltd., Kyoto-fu (JP)

(72) Inventor: Takayuki Yamakita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 208 days.

(21) Appl. No.: 17/339,847

(22) Filed: Jun. 4, 2021

(65) Prior Publication Data

US 2021/0296044 A1 Sep. 23, 2021

Related U.S. Application Data

(60) Division of application No. 15/354,421, filed on Nov. 17, 2016, now Pat. No. 11,043,325, which is a (Continued)

(30) Foreign Application Priority Data

May 19, 2014 (JP) ................................ 2014-103550

(51) Int. Cl.
*H01F 27/28* (2006.01)
*H01F 17/04* (2006.01)
(Continued)

(52) U.S. Cl.
CPC ....... *H01F 27/2823* (2013.01); *H01F 17/045* (2013.01); *H01F 27/006* (2013.01);
(Continued)

(58) Field of Classification Search
CPC .... H01F 27/2823; H01F 27/29; H01F 17/045; H01F 27/292; H01F 2017/0093; H01F 27/2828; H01F 2027/2838
(Continued)

(56) References Cited

U.S. PATENT DOCUMENTS

2014/0167903 A1* 6/2014 Tomonari .............. H01F 17/045 336/220

FOREIGN PATENT DOCUMENTS

JP 2008-034777 A 2/2008
JP 2008034777 A * 2/2008 ............. H01F 1/047
(Continued)

OTHER PUBLICATIONS

International Search Report issued in PCT/JP2015/063106; dated Jun. 23, 2015.
(Continued)

*Primary Examiner* — Tszfung J Chan

(74) *Attorney, Agent, or Firm* — Studebaker & Brackett PC

(57) ABSTRACT

A common-mode choke coil includes a core having a winding core portion, a first winding and a second winding. A winding start side region ranges from one end portion to a position where a first winding is brought into contact with the winding core portion, and a winding finish side region ranges from the other end portion to a position where a second winding is brought into contact with the winding core portion. The first winding is wound on the winding core portion such that the first winding is positioned on a negative direction side in an x axis direction with respect to the second winding at the same turn in the winding start side region and the second winding is interposed between the first winding and the winding core portion in the winding finish side region.

3 Claims, 17 Drawing Sheets

Related U.S. Application Data continuation of application No. PCT/JP2015/063106, filed on May 1, 2015.

(51) Int. Cl.
*H01F 27/00* (2006.01)
*H01F 27/29* (2006.01)
*H01F 41/069* (2016.01)
*H01F 17/00* (2006.01)
*H01F 41/073* (2016.01)

(52) U.S. Cl.
CPC .......... *H01F 27/29* (2013.01); *H01F 41/069* (2016.01); *H01F 2017/0093* (2013.01); *H01F 41/073* (2016.01)

(58) Field of Classification Search
USPC .......... 336/83, 187, 188, 189, 192, 221, 222
See application file for complete search history.

(56) References Cited

FOREIGN PATENT DOCUMENTS

| | | | | |
|---|---|---|---|---|
| JP | 2010-165953 | A | | 7/2010 |
| JP | 2010165953 | A | * | 7/2010 |
| JP | 2011-253888 | A | | 12/2011 |
| JP | 2011253888 | A | * | 12/2011 |
| JP | 2014-075533 | A | | 4/2014 |
| JP | 2014075533 | A | * | 4/2014 |
| JP | 2014-199904 | A | | 10/2014 |

OTHER PUBLICATIONS

Written Opinion issued in PCT/JP2015/063106; dated Jun. 23, 2015.
International Preliminary Report on Patentability issued in PCT/JP2015/063106; dated Nov. 22, 2016.

* cited by examiner

COMMON-MODE CHOKE COIL AND METHOD OF MANUFACTURING COMMON-MODE CHOKE COIL

CROSS REFERENCE TO RELATED APPLICATIONS

This application is a Divisional of U.S. patent application Ser. No. 15/354,421 filed on Nov. 17, 2016, which claims benefit of priority to Japanese Patent Application 2014-103550 filed May 19, 2014, and to International Patent Application No. PCT/JP2015/063106 filed May 1, 2015, the entire content of which is incorporated herein by reference.

TECHNICAL FIELD

The present disclosure relates to a common-mode choke coil and a method of manufacturing a common-mode choke coil.

BACKGROUND

As a conventional common-mode choke coil, there has been known a common-mode choke coil described in Japanese Patent Application Laid-Open No. 2011-253888. This type of common-mode choke coil (hereinafter simply referred to as "conventional common-mode choke coil") is, as shown in FIG. 23, formed such that two conductive wires are wound on a winding core portion extending in an x-axis direction such that two conductive wires run parallel to each other. The conventional common-mode choke coil has: a first region where the other conductive wire is wound on the winding core portion such that the other conductive wire wraps one conductive wire; and a second region where one conductive wire is wound on the winding core portion such that one conductive wire wraps the other conductive wire. Further, in the conventional common-mode choke coil, the numbers of turns of the respective conductive wires in the first region and the second region are set equal thus making two conductive wires have the same length. With such a configuration, it is possible to suppress a so-called mode conversion where some signals in a differential mode are converted into signals in a common mode when the signals pass the common-mode choke.

However, in the conventional common-mode choke coil, the manner of winding the conductive wire at an end portion 8 on a negative direction side in an x-axis direction in the first region and the manner of winding the conductive wire at an end portion C on a positive direction side in the x-axis direction in the second region differ from each other. Accordingly, to compare the positional relationship of the windings between the negative direction side and the positive direction side in the x-axis direction using a boundary between the first region and the second region in the winding core portion as an axis Lx without distinguishing one winding and the other winding from each other, the positional relationship of windings is asymmetrical between the negative direction side and the positive direction side. As a result, in the conventional common-mode choke coil, there exists a drawback that a mode conversion occurs.

SUMMARY

Problem to be Solved by the Disclosure

It is an object of the present disclosure to provide a common-mode choke coil which can suppress the occurrence of a mode conversion and a method of manufacturing such a common-mode choke coil.

Means for Solving the Problem

According to a first aspect of the present disclosure, there is provided a common-mode choke coil which includes:

a core extending in an axial direction and having a winding core portion which includes a first region and a second region;

a first winding wound on the winding core portion; and a second winding wound on the winding core portion in a state where the second winding runs parallel to the first winding, wherein the first region covers an area from a first end portion on one side of a portion of the first winding which is brought into contact with the winding core portion to a first position disposed in front of a center of the winding core portion, the second region covers an area from a second end portion on the other side of a portion of the second winding which is brought into contact with the winding core portion to a second position disposed in front of the center of the winding core portion, the first winding is wound on the winding core portion such that the first winding is positioned on the one side with respect to the second winding of same turns as the first winding in the first region and the first winding sandwiches the second winding in the second region, the second winding is wound on the winding core portion such that the second winding is positioned on the other side with respect to the first winding of same turns as the second winding in the second region and the second winding sandwiches the first winding in the first region, the number of turns of the first winding and the number of turns of the second winding are equal to each other, and the number of winding times that the first winding is wound in a state where the first winding is brought into contact with the winding core portion and the number of winding times that the second winding is wound in a state where the second winding is brought into contact with the winding core portion are equal to each other.

According to a second aspect of the present disclosure, there is provided a method of manufacturing a common-mode choke coil where a first winding and a second winding are wound on a winding core portion by rotating a chuck which grips a core having the winding core portion, the method comprising:

a first step of winding only the first winding on the winding core portion by only one turn;

a second step of simultaneously winding the first winding and the second winding such that the second winding is wound on the winding core portion with the first winding interposed between the second winding and the winding core portion after the first step is finished;

a third step of winding only the second winding on the winding core portion by at least one turn after the second step is finished; and a fourth step of simultaneously winding the first winding and the second winding such that the first winding is wound on the winding core portion with the second winding interposed between the first winding and the winding core portion after the third step is finished.

According to a third aspect of the present disclosure, there is provided a method of manufacturing a common-mode choke coil where a first winding supplied from a first nozzle and a second winding supplied from a second nozzle are wound on a winding core portion by rotating a chuck which grips a core having the winding core portion, the method comprising:

a first step of disposing the first nozzle such that the first winding is pressed to the winding core portion, disposing the second nozzle such that the second winding is not pressed to the winding core portion, and rotating the chuck one time;

a second step of, after the first step is finished, disposing the first nozzle such that the first winding is pressed to the winding core portion, disposing the second nozzle such that the second winding is pressed to the winding core portion with the first winding interposed between the second winding and the winding core portion, and moving the first nozzle and the second nozzle in an axial direction of the winding core portion while rotating the chuck;

a third step of disposing the second nozzle such that the second winding is pressed to the winding core portion, disposing the first nozzle such that the first winding is not pressed to the winding core portion, and rotating the chuck one time; and a fourth step of, after the third step is finished, disposing the second nozzle such that the second winding is pressed to the winding core portion, disposing the first nozzle such that the first winding is pressed to the winding core portion with the second winding interposed between the first winding and the winding core portion, and moving the first nozzle and the second nozzle in the axial direction of the winding core portion while rotating the chuck.

In the common-mode choke coil according to the first aspect of the present disclosure, the first winding is positioned on one side with respect to the second winding on the same turn as the first winding in the first region, and the first winding is wound on the winding core portion with the second winding interposed between the first winding and the winding core portion in the second region. The second winding is positioned on the other side with respect to the first winding on the same turn as the second winding in the second region, and the second winding is wound on the winding core portion with the first winding interposed between the second winding and the winding core portion in the first region. Accordingly, to compare a positional relationship of the windings on one side of the winding core portion and the positional relationship of the windings on the other side of the winding core portion to each other without distinguishing the first winding and the second winding using a straight line which passes a middle point of a segment which connects the first region and the second region on the winding core portion and is orthogonal to the winding core portion as an axis of symmetry, the positional relationship of the windings on one side and the positional relationship of the windings on the other side are symmetrical to each other. Further, the number of turns of the first winding and the number of turns of the second winding are equal to each other, and the number of winding times that the first winding is wound on the winding core portion in a state where the first winding is brought into contact with the winding core portion and the number of winding times that the second winding is wound on the winding core portion in a state where the second winding is brought into contact with the winding core portion are equal to each other. Accordingly, a length of the first winding and a length of the second winding are equal to each other.

Advantageous Effect of the Disclosure

According to the present disclosure, the occurrence of a mode conversion can be suppressed.

DETAILED DESCRIPTION

Figure 1:
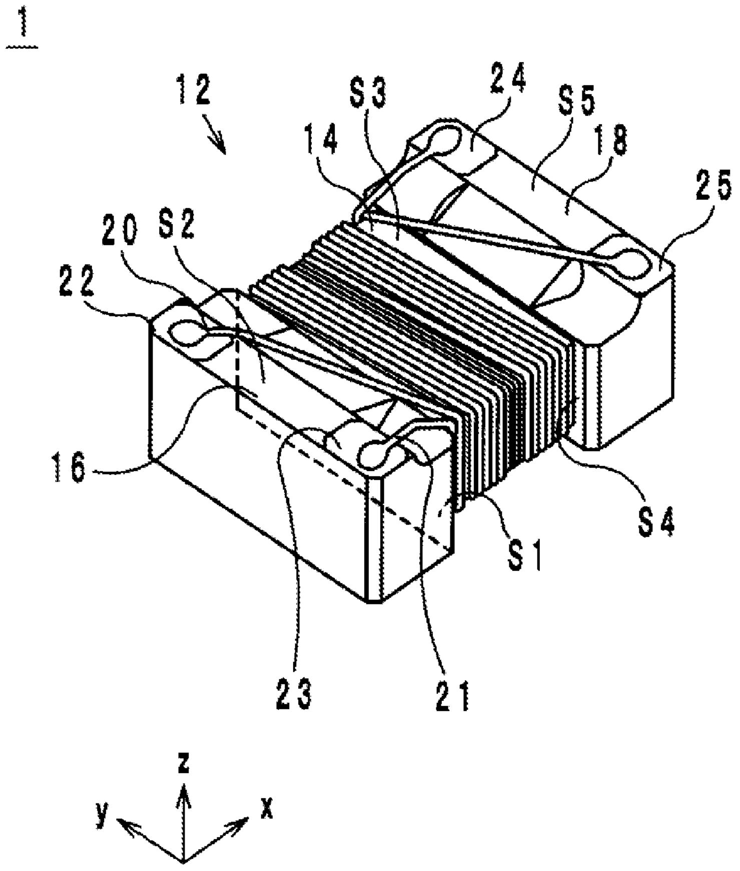
FIG. 1 is an external appearance view of a common-mode choke coil according to one embodiment.
Figure 2:
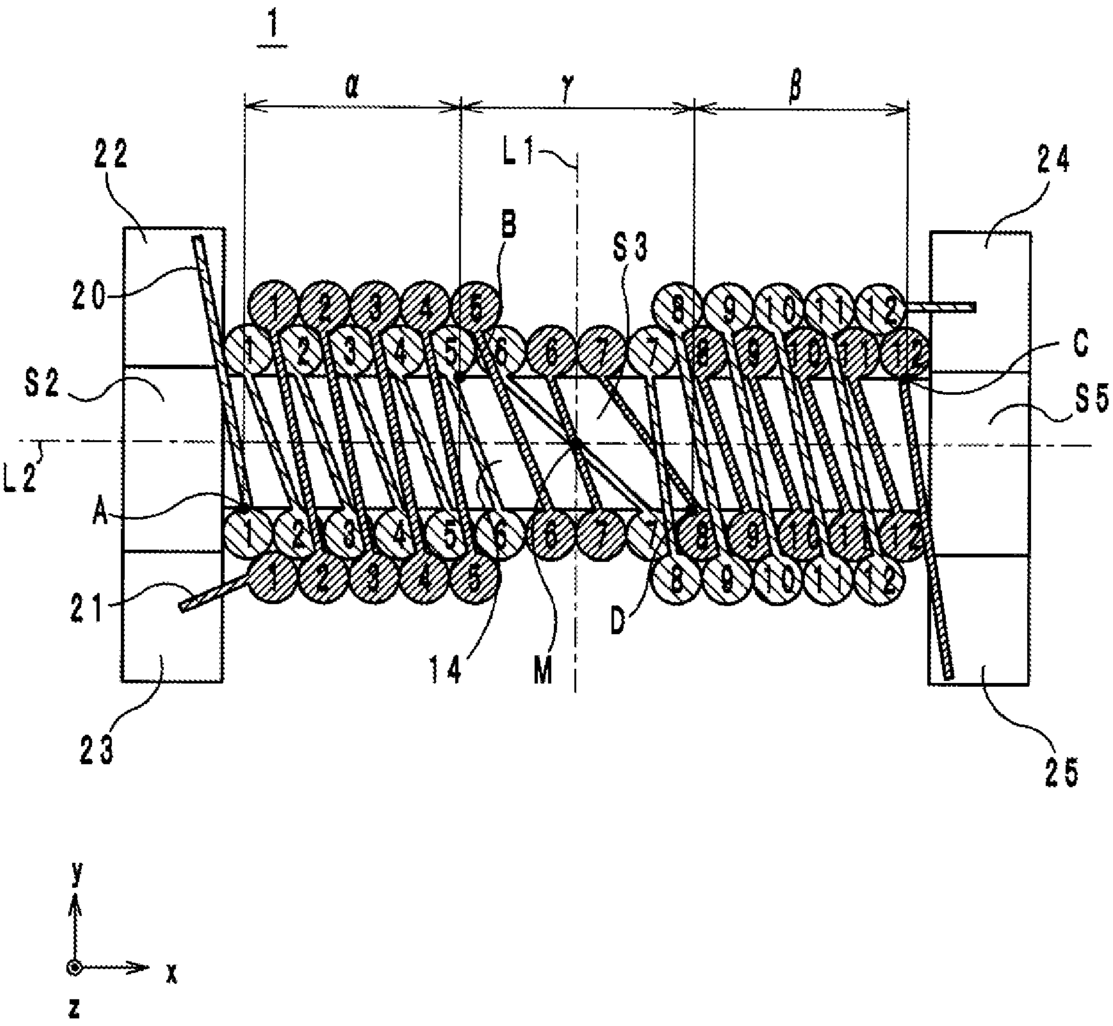
FIG. 2 is a schematic view showing a winding state of windings of the common-mode choke coil according to one embodiment.

Mode for Carrying Out the Disclosure (Configuration of Common-Mode Choke Coil, See FIG. 1 and FIG. 2)

A common-mode choke coil 1 according to one embodiment is described with reference to drawings. Hereinafter, a direction along which a center axis of a winding core portion 14 extends is defined as an x axis direction. Further, as viewed from the x axis direction, a direction along a long side of a flange portion 16 is defined as a y axis direction, and a direction along a short side of the flange portion 16 is defined as a z axis direction. An x axis, a y axis and a z axis are orthogonal to each other.

As shown in FIG. 1, the common-mode choke coil 1 includes a core 12, windings 20, 21, and external electrodes 22 to 25. As shown in FIG. 2, the common-mode choke coil 1 is roughly divided into a winding start side region α (first region) where winding of the windings 20, 21 is started, a winding finish side region β (second region) where the winding of the windings 20, 21 is finished, and a center region γ disposed between the winding start side region α and the winding finish side region β. To facilitate the understanding of the configuration of the common-mode choke coil 1, in FIG. 2, portions of the common-mode choke coil 1 other than the windings 20, 21 shown in transverse cross section are described in size smaller than an actual size.

The core 12 is made of a magnetic material such as ferrite or alumina, for example. The core 12 includes a winding core portion 14 and flange portions 16, 18.

The winding core portion 14 is a prismatic member extending in the x axis direction. However, the winding core portion 14 is not limited to a prismatic shape, and may have a circular columnar shape. In FIG. 2, the winding core portion 14 is described in size smaller than a size used in describing the winding core portion 14 in FIG. 1.

As shown in FIG. 1, the flange portions 16, 18 are mounted on both ends of the winding core portion 14 in the x axis direction. To be more specific, the flange portion 16 is mounted on one end of the winding core portion 14 on a negative direction side in the x axis direction. The flange portion 18 is mounted on the other end of the winding core portion 14 on a positive direction side in the x axis direction.

The flange portion 16 has an approximately rectangular parallelepiped shape. Further, on a corner portion of the flange portion 16 made by a surface S1 of the flange portion 16 disposed on a positive direction side in the x axis direction and a surface S2 of the flange portion 16 disposed on a positive direction side (first direction) in the z axis direction, a recess is formed by cutting the corner portion toward the inside of the flange portion 16. However, the recess is not formed on a center portion of the flange portion 16 in the y axis direction. Instead, an inclined surface extending toward a surface S3 of the winding core portion 14 on a positive direction side in the z axis direction from the surface S2 of the flange portion 16 is formed on the center portion.

The flange portion 18 has an approximately rectangular parallelepiped shape. Further, on a corner portion of the flange portion 18 made by a surface S4 of the flange portion 18 disposed on a negative direction side in the x axis direction and a surface S5 of the flange portion 18 disposed on a positive direction side in the z axis direction, a recess is formed by cutting the corner portion toward the inside of the flange portion 18. However, the recess is not formed on a center portion of the flange portion 18 in the y axis direction. Instead, an inclined surface extending toward the surface S3 of the winding core portion 14 from the surface S5 of the flange portion 18 is formed on the center portion.

The external electrodes 22 to 25 are respectively made of an Ni-based alloy such as Ni—Cr, Ni—Cu or Ni, and Ag, Cu, Sn or the like. The external electrodes 22 to 25 respectively have an approximately rectangular shape as viewed from a positive direction side in the z axis direction.

The external electrodes 22, 23 are mounted on the surface S2 of the flange portion 16 such that the external electrodes 22, 23 are arranged in a row from a positive direction side to a negative direction side in the y axis direction in this order. In this case, the external electrodes 22, 23 are arranged in a row in a spaced-apart manner such that the external electrodes 22, 23 are not brought into contact with each other.

The external electrodes 24, 25 are mounted on the surface S5 of the flange portion 18 such that the external electrodes 24, 25 are arranged in a row from a positive direction side to a negative direction side in the y axis direction in this order. In this case, the external electrodes 24, 25 are arranged in a row in a spaced-apart manner such that the external electrodes 24, 25 are not brought into contact with each other. The windings 20, 21 are conductive wires wound on the winding core portion 14 such that the windings 20, 21 run parallel to each other, and the windings 20, 21 are respectively formed such that a core wire which is mainly made of a conductive material such as copper or silver is covered by an insulating material such as polyurethane or the like. Further, as shown in FIG. 2, the windings 20, 21 are respectively formed by being wound on the winding core portion 14 twelve times. Hereinafter, the respective windings 20, 21 are described specifically.

One end of the winding 20 (first winding) on a negative direction side in the x axis direction is connected to the external electrode 22 on the surface S2, and the other end of the winding 20 on a positive direction side in the x axis direction is connected to the external electrode 24 on the surface S5.

The winding 20 is wound on the winding core portion 14 such that the winding 20 is positioned on a negative direction side (one side) in the x axis direction with respect to the winding 21 at the same turn in the winding start side region α (first region) ranging from one end portion A (first end portion) on a negative direction side in the x axis direction where the winding 20 is brought into contact with the winding core portion 14 to a winding position B (first position) disposed in front of the center of the winding core portion 14. Counting of the respective numbers of turns of the windings 20, 21 in the winding start side region α is started from one end portion A on a negative direction side in the x axis direction where the windings 20, 21 are wound on the winding core portion.

In the winding start side region α, the winding 20 is wound on the winding core portion 14 in a state where the winding is brought into direct contact with the winding core portion 14, and the winding 21 is further wound on the winding 20. That is, the winding 21 is wound on the winding core portion 14 in the winding start side region α with the winding 20 interposed between the winding 21 and the winding core portion 14.

One end of the winding 21 (second winding) on a negative direction side in the x axis direction is connected to the external electrode 23 on the surface S2, and the other end of the winding 21 on a positive direction side in the x axis direction is connected to the external electrode 25 on the surface S5.

The winding 21 is wound on the winding core portion 14 such that the winding 21 is positioned on a positive direction side (the other side) in the x axis direction with respect to the winding 20 at the same turn in the winding finish side region β (second region) ranging from the other end portion C (second end portion) on a positive direction side in the x axis direction where the winding 21 is brought into contact with the winding core portion 14 to a winding position D (second position) disposed in front of the center of the winding core portion 14. Counting of the respective number of turns of the windings 20, 21 in the winding finish side region β is started from the other end portion C on a positive direction side in the x axis direction where the windings 20, 21 are wound on the winding core portion.

In the winding finish side region β, the winding 21 is wound on the winding core portion 14 in a state where the winding 21 is brought into direct contact with the winding core portion 14, and the winding 20 is further wound on the winding 21. That is, the winding 20 is wound on the winding core portion 14 in the winding finish side region β with the winding 21 interposed between the winding 20 and the winding core portion 14.

With respect to the windings 20, 21, the relative positional relationship in the x axis direction between the winding 20 and the winding 21 is reversed between the winding start side region α and the winding finish side region β. Accordingly, the windings 20, 21 intersect with each other in the center region γ ranging from the position B to the position D of the winding core portion 14. In this case, the windings 20, 21 intersect with each other on the surface S3 of the winding core portion 14. Further, both windings 20, 21 are directly wound on the winding core portion 14 seven times.

(Manufacturing method: see FIG. 2 to FIG. 17)

Hereinafter, a method of manufacturing the common-mode choke coil 1 according to one embodiment is described. The x axis direction used in the description of the manufacturing method is a direction along which a center axis of the winding core portion 14 of the common-mode choke coil 1 manufactured by the manufacturing method extends. The y axis direction used in the description of the manufacturing method is a direction along which the long side of the flange portion 16 extends when the core 12 is fixed to a chuck C1, and the z axis direction used in the description of the manufacturing method is a direction along which the short side of the flange portion 16 extends when the core 12 is fixed to the chuck C1.

In the manufacture of the common-mode choke coil 1, firstly, a powder which contains ferrite as a main component and is used as a material for forming the core 12 is prepared. Then, ferrite powder prepared in this manner is filled in a female die. By pressing powder filled in the female die by a male die, the filled powder is molded to form a compact having a shape of the winding core portion 14 and shapes of the flange portions 16, 18.

Next, after the compact having portions corresponding to the winding core portion 14 and the flange portions 16, 18 is molded, the compact is baked so that the core 12 is completed.

To form the external electrodes 22 to 25, an Ag paste is applied by coating both end portions of the surfaces S2, S5 of the flange portions 16, 18 in the y axis direction respectively. Next, adhered Ag paste is dried and baked so that Ag films which form base electrodes for the external electrodes 22 to 25 are formed. Then, a metal film made of an Ni-based alloy is formed on the Ag film by applying an electroplating or the like. The external electrodes 22 to 25 are formed in accordance with the above-mentioned steps.

Figure 3:
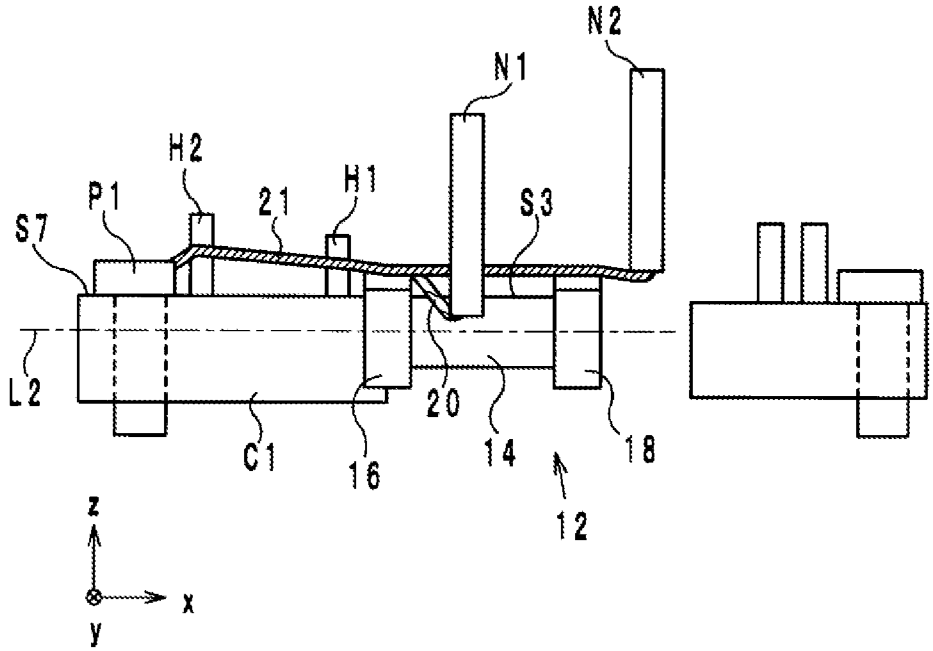
FIG. 3 is a view showing a step of manufacturing the common-mode choke coil according to one embodiment.
Figure 4:
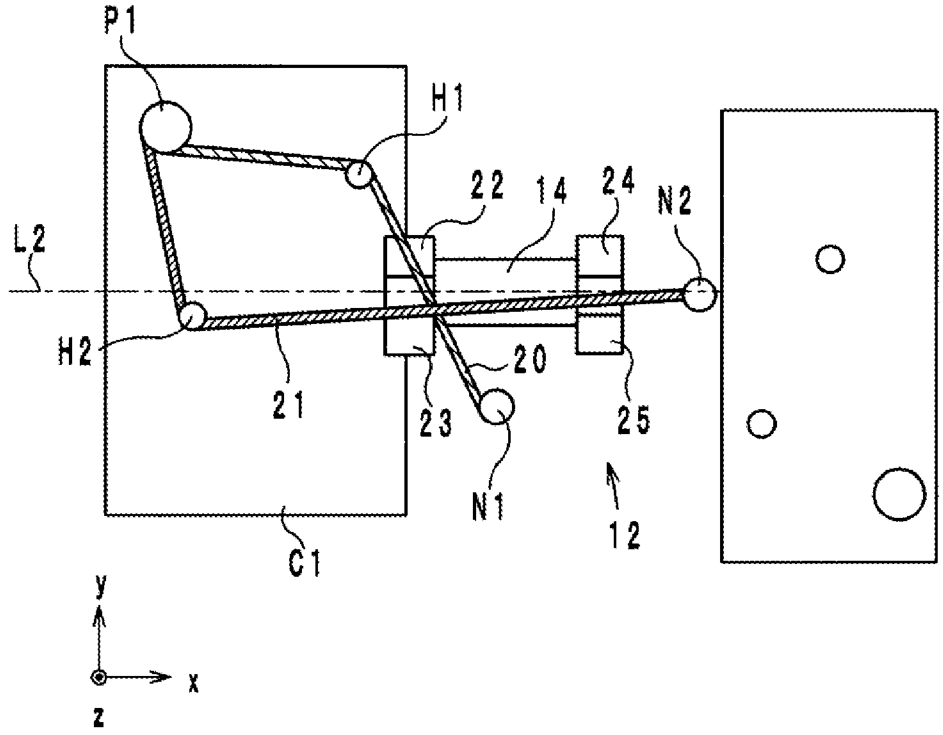
FIG. 4 is a view showing a step of manufacturing the common-mode choke coil according to one embodiment.

Next, the windings 20, 21 are wound on the winding core portion 14 of the core 12. In steps of winding the windings 20, 21, as shown in FIG. 3 and FIG. 4, firstly, the core 12 is fixed to the chuck C1. The core 12 is fixed to the chuck C1 by grasping the flange portion 16 of the core 12 by the chuck. Then, the chuck C1 is connected to a rotary drive device not shown in the drawing so that the chuck C1 is rotatable using a center axis L2 of the winding core portion 14 of the core 12 as an axis of rotation.

After the core 12 is fixed to the chuck C1, one end of the winding 20 supplied from a nozzle N1 and one end of the winding 21 supplied from a nozzle N2 are clamped by a wire clamp P1 mounted on the chuck C1. The wire clamp P1 is mounted on a surface S7 of the chuck C1 which is approximately parallel to the surface S3 of the winding core portion 14 of the core 12, and is positioned on a negative direction side in the x axis direction and on a positive direction side in the y axis direction with respect to the core 12. Then, nozzles N1, N2 are connected to a drive unit not shown in the drawing, and are movable in an arbitrary direction in a three-dimensional space.

Next, the winding 20 is hooked on a rod-like hooking pin H1 mounted on the chuck C1. To be more specific, the hooking pin H1 is mounted on the surface S7 of the chuck C1, and is positioned between the wire clamp P1 and the core 12 in the x axis direction. The hooking pin H1 is also positioned in the vicinity of the external electrode 22 of the core 12 fixed to the chuck C1 and on a positive direction side in the y axis direction with respect to the core 12. In a state where the winding 20 is brought into contact with a side surface of the hooking pin H1 disposed as described above on a positive direction side in the y axis direction, the nozzle N1 which supplies the winding 20 is moved to a negative direction side in the y axis direction with respect to the core 12 and to a negative direction side in the z axis direction with respect to the core 12. Due to such an operation, the winding 20 is hooked on the hooking pin H1 while being pressed to the winding core portion 14.

In parallel with the operation of hooking the winding 20 on the hooking pin H1, the winding 21 is hooked on a rod-like hooking pin H2 mounted on the chuck C1. To be more specific, the hooking pin H2 is mounted on the surface S7 of the chuck C1, and is positioned between the wire clamp P1 and the core 12 in the x axis direction. Further, the hooking pin H2 is positioned in the vicinity of an extension of a center axis L2 of the winding core portion 14 of the core 12, that is, in the vicinity of an axis of rotation of the chuck C1. In a state where the winding 21 is brought into contact with a side surface on a negative direction side in the y axis direction of the hooking pin H2 disposed as described above, the nozzle N2 is moved toward a positive direction side in the x axis direction with respect to the core 12. Due to such an operation, the winding 21 is hooked on the hooking pin H2. However, the above-mentioned movement of the nozzle N2 means that the nozzle N2 moves substantially parallel to the center axis L2 of the core 12 and hence, there is no possibility that the winding 21 is pressed to the winding core portion 14.

Figure 5:
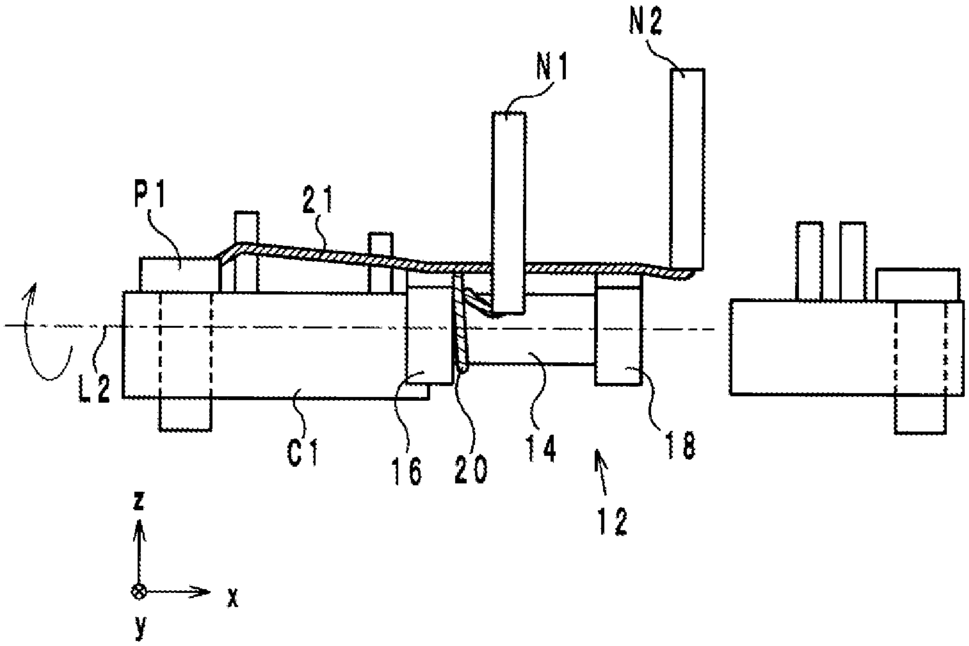
FIG. 5 is a view showing a step (first step) of manufacturing the common-mode choke coil according to one embodiment.
Figure 6:
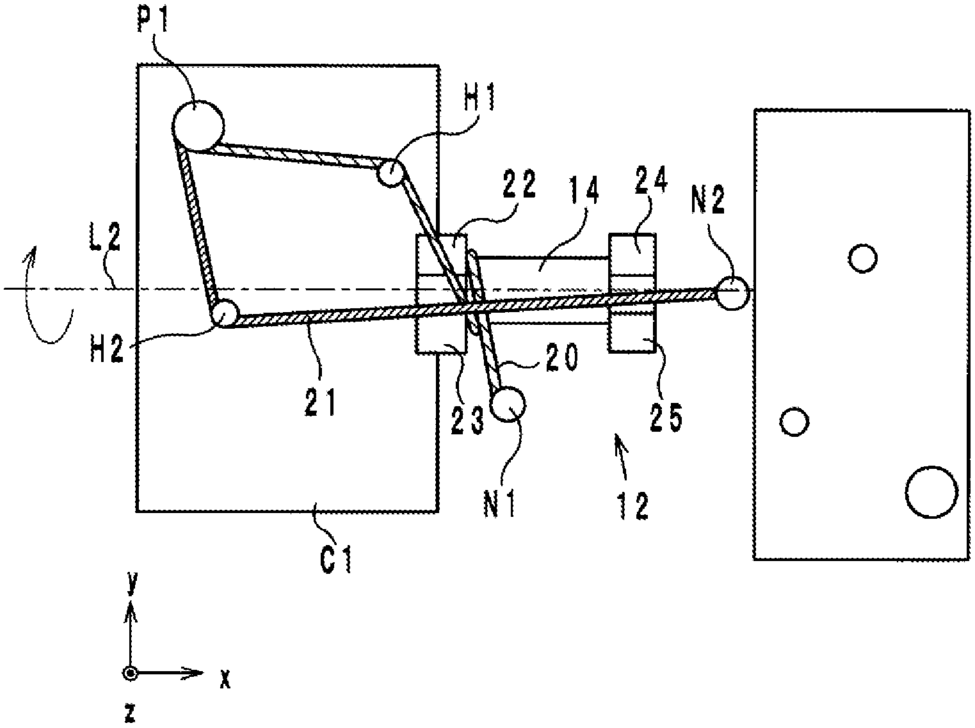
FIG. 6 is a view showing the step (first step) of manufacturing the common-mode choke coil according to one embodiment.

Next, the chuck C1 is rotated. Due to the rotation of the chuck C1, as shown in FIG. 5 and FIG. 6, the winding 20 is wound on the winding core portion 14 only one time. Then, the nozzle N2 is positioned in the vicinity of the center axis L2 of the winding core portion 14 of the core 12, and is positioned on a positive direction side in the x axis direction with respect to the flange portion 18 and hence, there is no possibility that the winding 21 is wound on the winding core portion 14. Accordingly, in this step, the winding 20 is wound on the winding core portion 14 prior to the winding 21 by only one turn (first step is finished).

After the winding 20 is wound on the winding core portion 14 only one time, the nozzle N2 is moved in a state where a position of the nozzle N1 is held. To be more specific, the nozzle N2 is moved from a position in the vicinity of the center axis L2 of the winding core portion 14 to a negative direction side in the y axis direction and to a negative direction side in the z axis direction. With such an operation, the nozzle N2 moves to a position in the vicinity of the nozzle N1, and the winding 21 is pressed to the winding core portion 14 with the winding 20 interposed therebetween.

Figure 7:
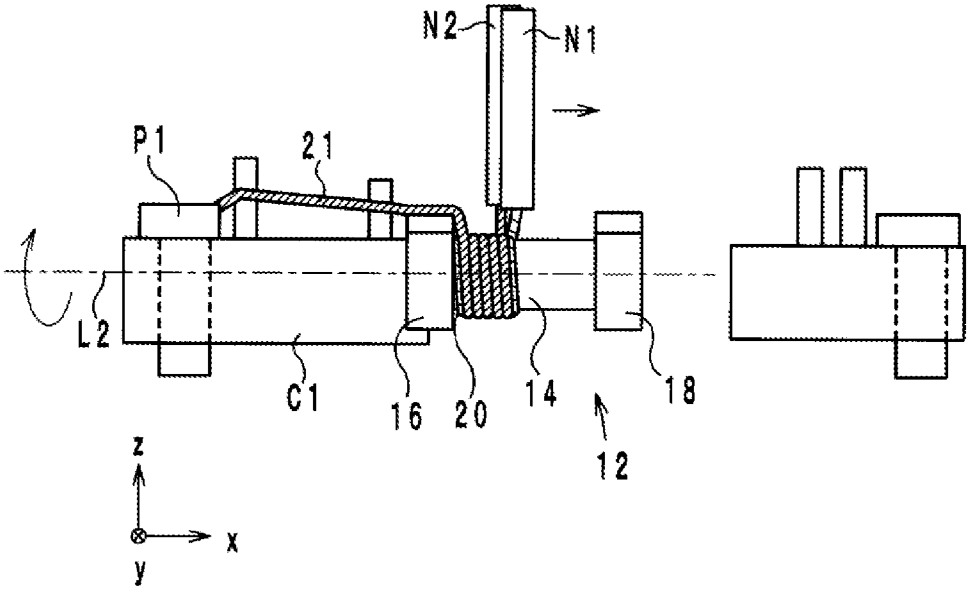
FIG. 7 is a view showing a step (second step) of manufacturing the common-mode choke coil according to one embodiment.
Figure 8:
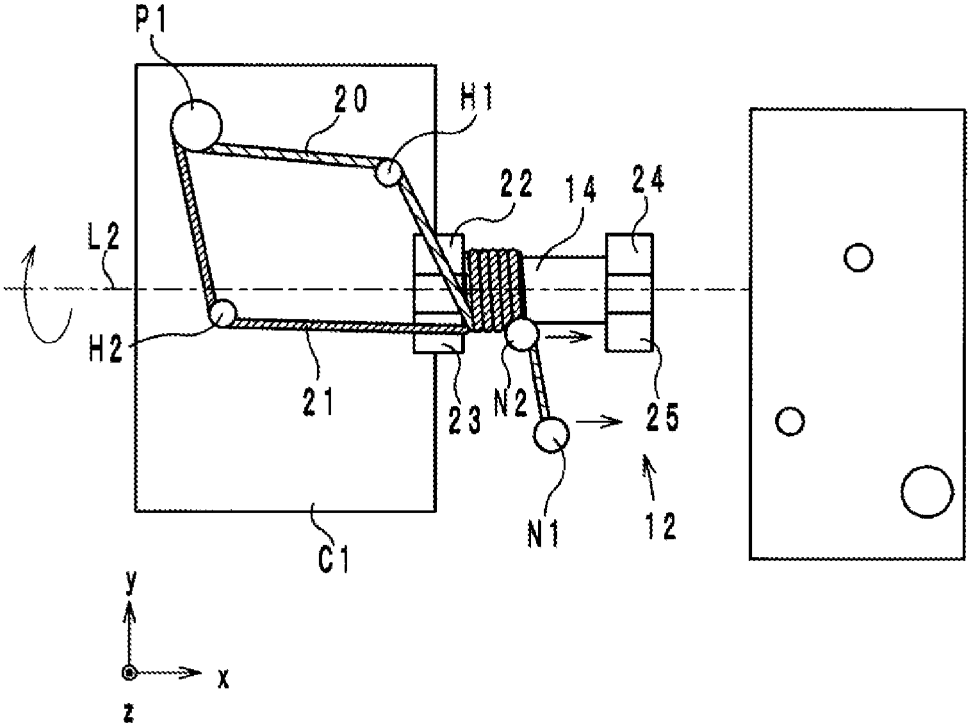
FIG. 8 is a view showing the step (second step) of manufacturing the common-mode choke coil according to one embodiment.
Figure 9:
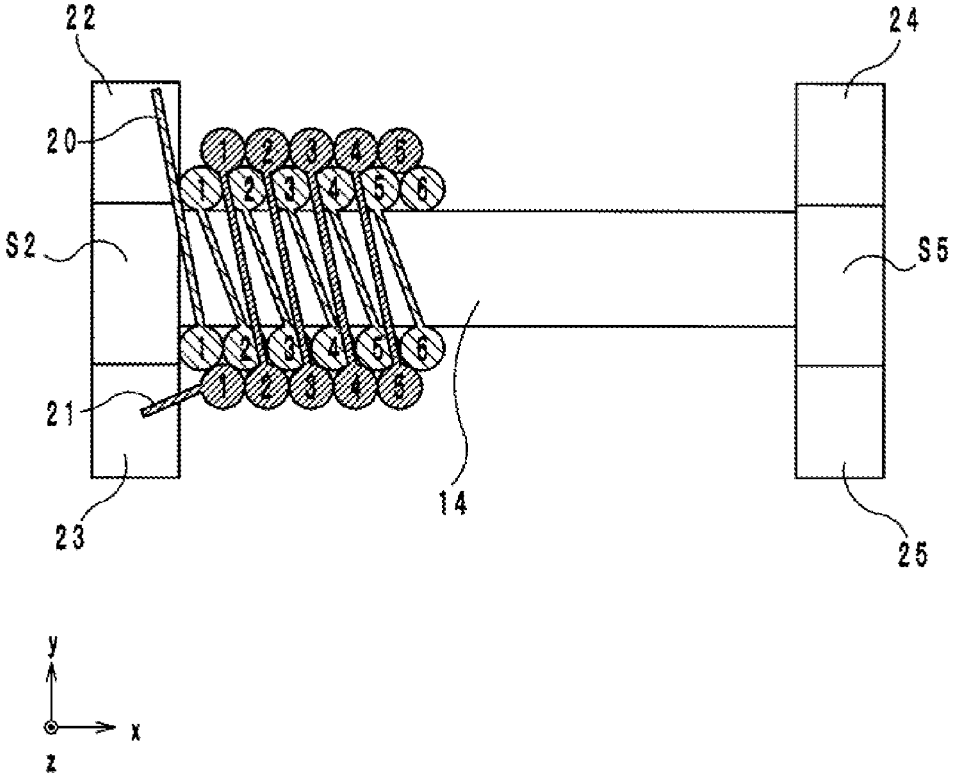
FIG. 9 is a schematic view showing a winding state of windings of the common-mode choke coil in the manufacturing step (step which comes after the second step)

As shown in FIG. 7 and FIG. 8, the chuck C1 is rotated by five times while moving the nozzles N1, N2 toward a positive direction side in the x axis direction. With such an operation, as shown in FIG. 9, the winding 20 is directly wound on the winding core portion 14 and, at the same time, the winding 21 is wound on the winding core portion 14 so as to sandwich the winding 20 between the winding 21 and the winding core portion 14. Here, the winding 20 is wound on the winding core portion 14 only one time before this step is performed and hence, the total number of winding times of the winding 20 with respect to the winding core portion 14 is 6. On the other hand, the total number of winding times of the winding 21 with respect to the winding core portion 14 is 5 (second step is finished).

Figure 10:
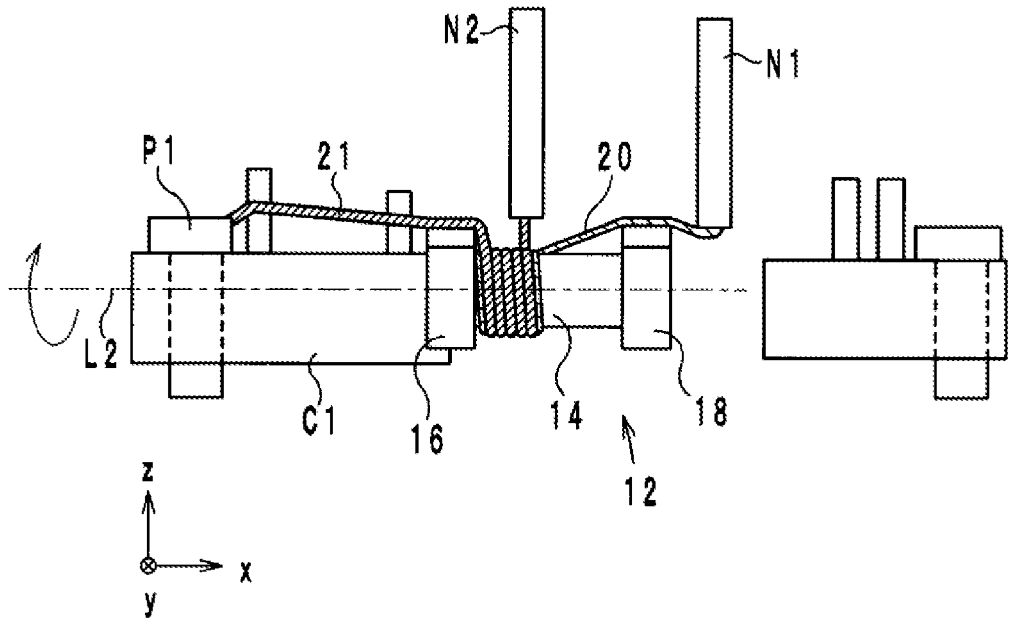
FIG. 10 is a view showing a step (third step) of manufacturing the common-mode choke coil according to one embodiment.
Figure 11:
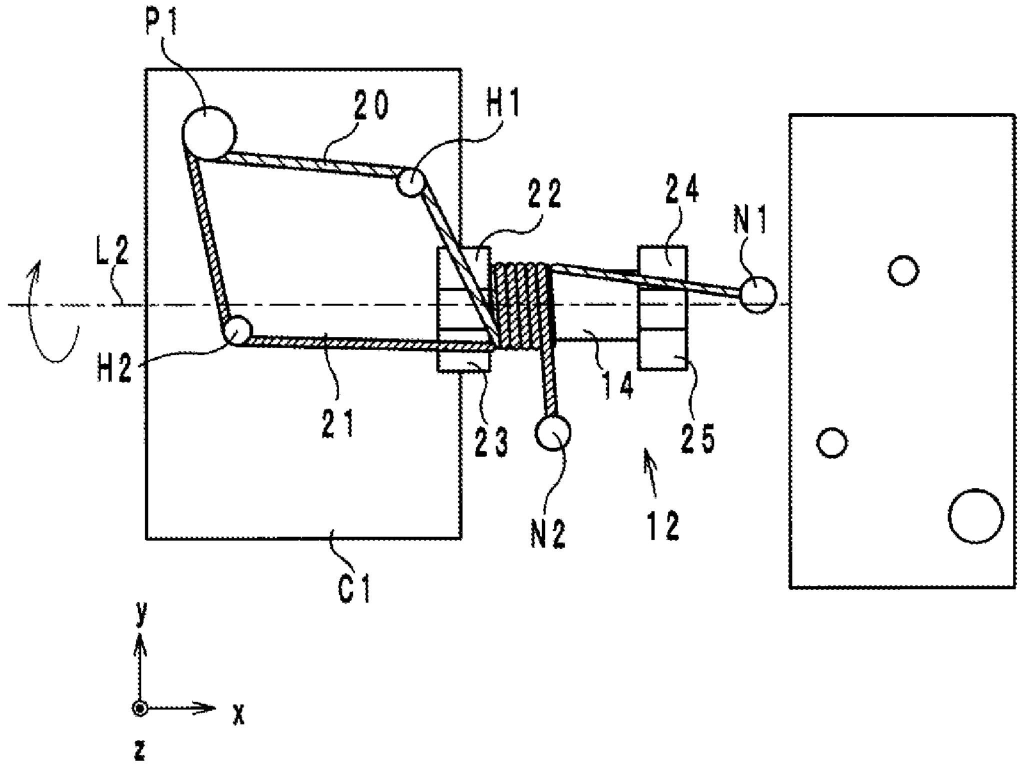
FIG. 11 is a view showing the step (third step) of manufacturing the common-mode choke coil according to one embodiment.

Next, as shown in FIG. 10 and FIG. 11, the nozzle N1 is moved in a state where a position of the nozzle N2 is held. To be more specific, the nozzle N1 is moved to a position in the vicinity of the center axis L2 of the winding core portion 14 of the core 12 from a position on a negative direction side in the y axis direction and on a negative direction side in the z axis direction with respect to the core 12. With such an operation, a state is brought about where only the winding 21 is pressed to the winding core portion 14.

Figure 12:
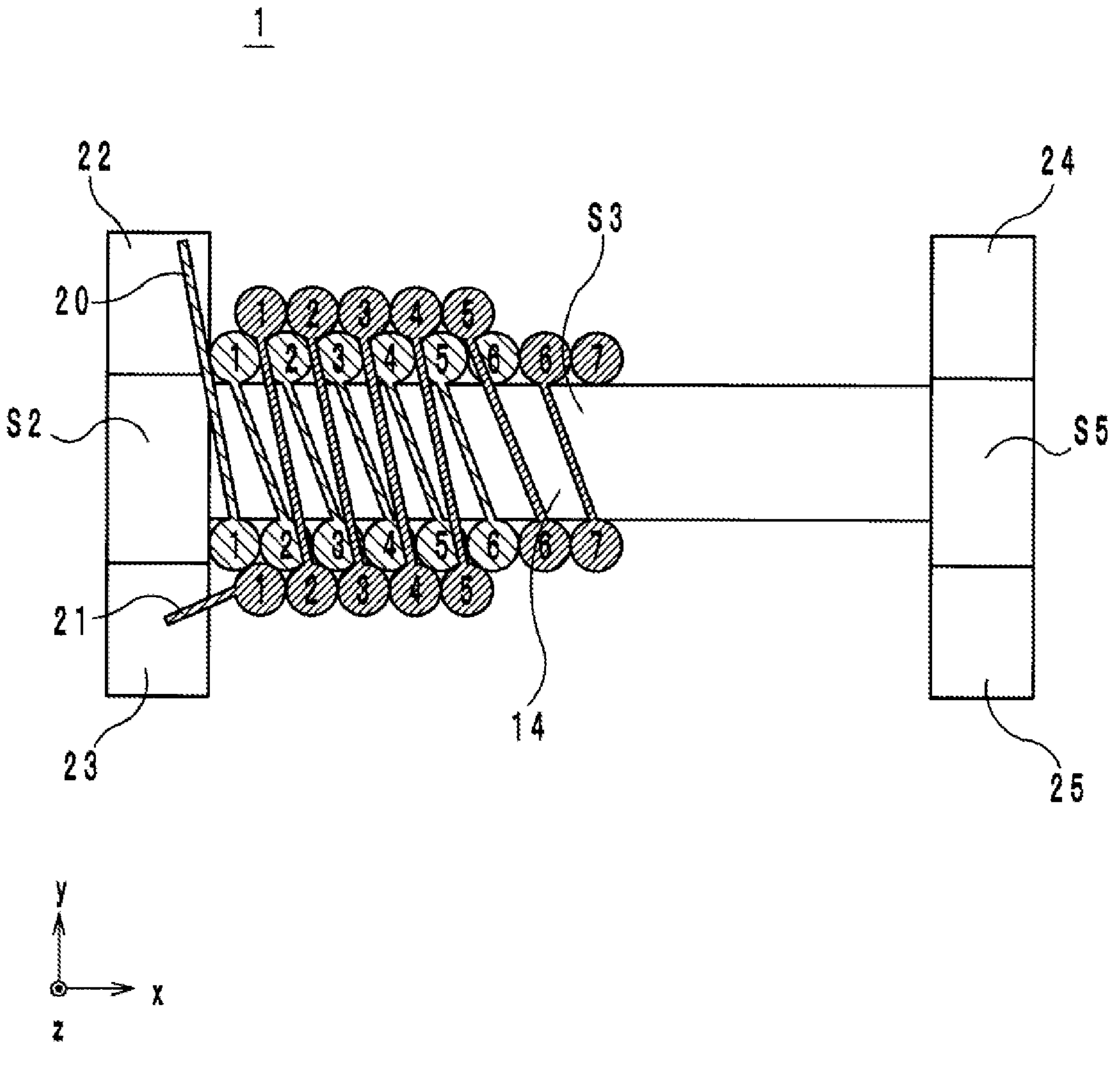
FIG. 12 is a schematic view showing a winding state of windings of the common-mode choke coil in the manufacturing step (step which comes after the fifth step).

After the nozzle N1 is moved, firstly, the chuck C1 is rotated one time. Thereafter, by further rotating the chuck C1 one time, the winding 21 is wound on the winding core portion 14 by two turns. At this stage of operation, the nozzle N1 is positioned in the vicinity of the center axis L2 and on a positive direction side in the x axis direction with respect to the flange portion 18 and hence, there is no possibility that the winding 20 is wound on the winding core portion 14. Further, by rotating the chuck C1 two times in this step, as shown in FIG. 12, the total number of turns of the winding 21 with respect to the winding core portion 14 becomes seven (third step and fifth step are finished).

Next, the position of the nozzle N1 and the position of the nozzle N2 are exchanged with each other. To be more specific, the nozzle N1 positioned in the vicinity of the center axis L2 is moved to the position on a negative direction side in the y axis direction and on a negative direction side in the z axis direction with respect to the core 12, and the nozzle N2 positioned on a negative direction side in the y axis direction and on a negative direction side in the z axis direction with respect to the core 12 is moved to the position in the vicinity of the center axis L2. With such an operation, a state is brought about where only the winding 20 is pressed to the winding core portion 14.

Figure 13:
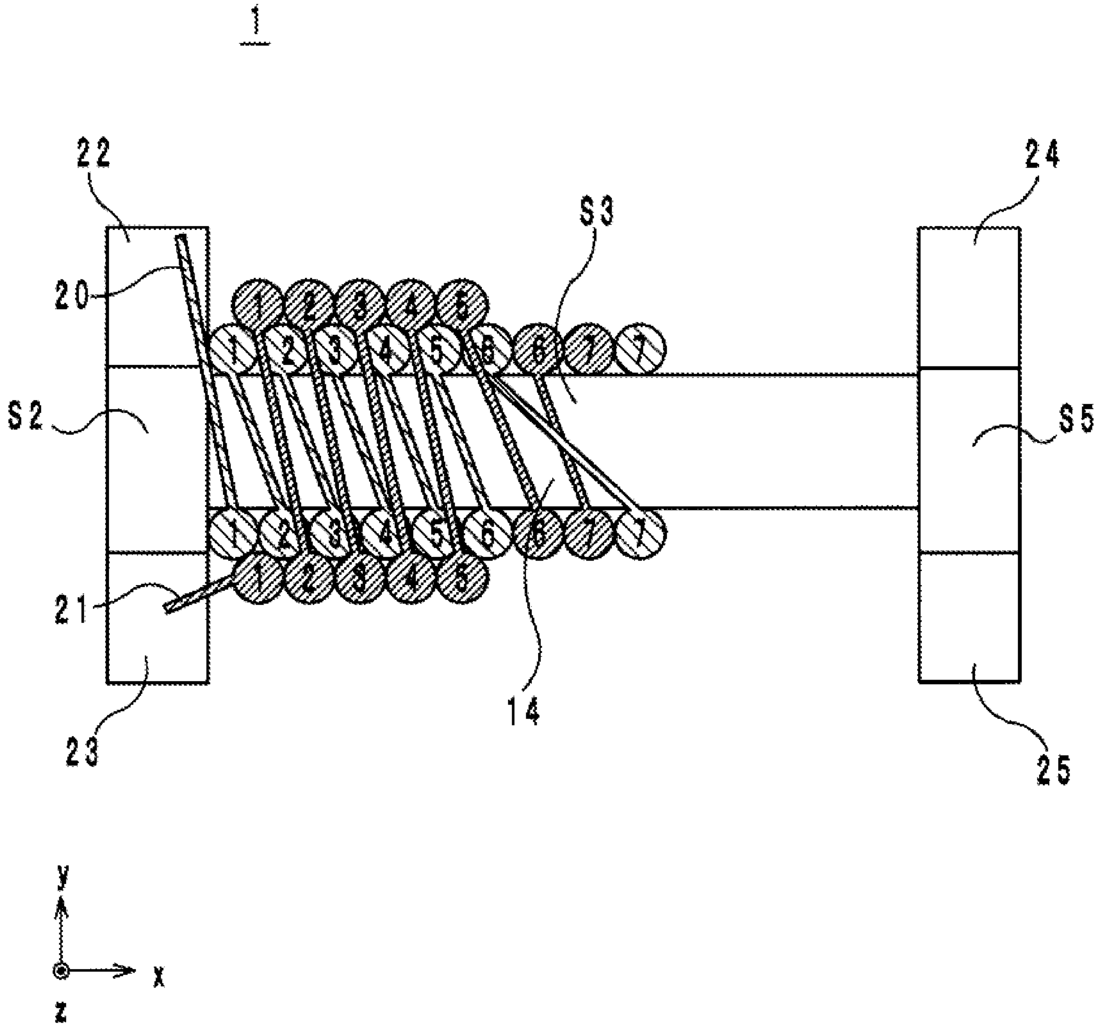
FIG. 13 is a schematic view showing a winding state of windings of the common-mode choke coil in the manufacturing step (step which comes after the sixth step).

After the position of the nozzle N1 and the position of the nozzle N2 are exchanged with each other, the chuck C1 is rotated one time. Due to the rotation of the chuck C1, the winding 20 is wound on the winding core portion 14 only one time. At this stage of operation, the nozzle N2 is positioned in the vicinity of the center axis L2 and on a positive direction side in the x axis direction with respect to the flange portion 18 and hence, there is no possibility that the winding 21 is pressed to the winding core portion 14. In this step, by rotating the chuck C1 one time, as shown in FIG. 13, the total number of turns of the winding 20 with respect to the winding core portion 14 becomes seven (sixth step is finished).

Figure 14:
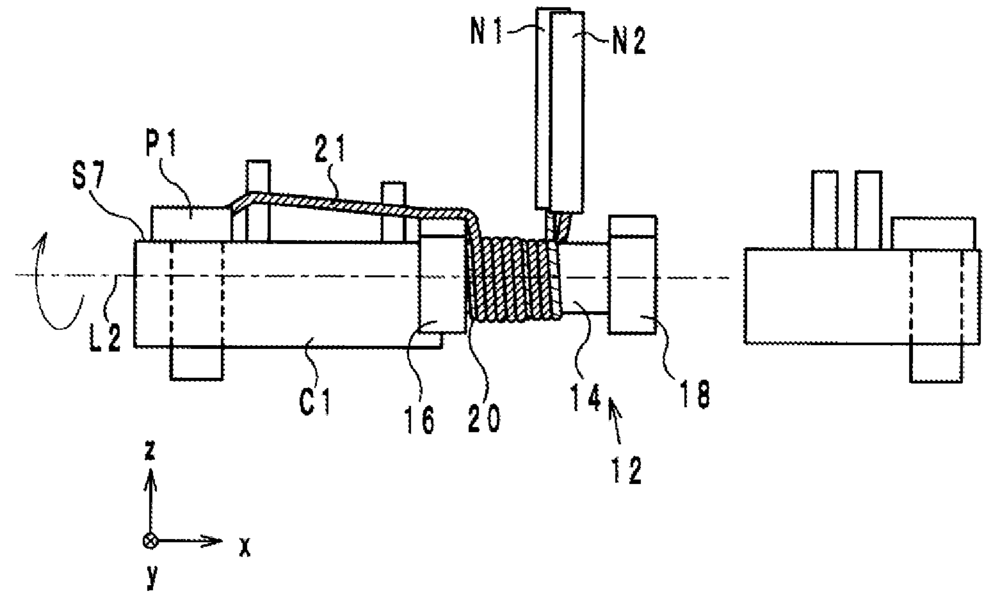
FIG. 14 is a view showing a step (fourth step) of manufacturing the common-mode choke coil according to one embodiment.
Figure 15:
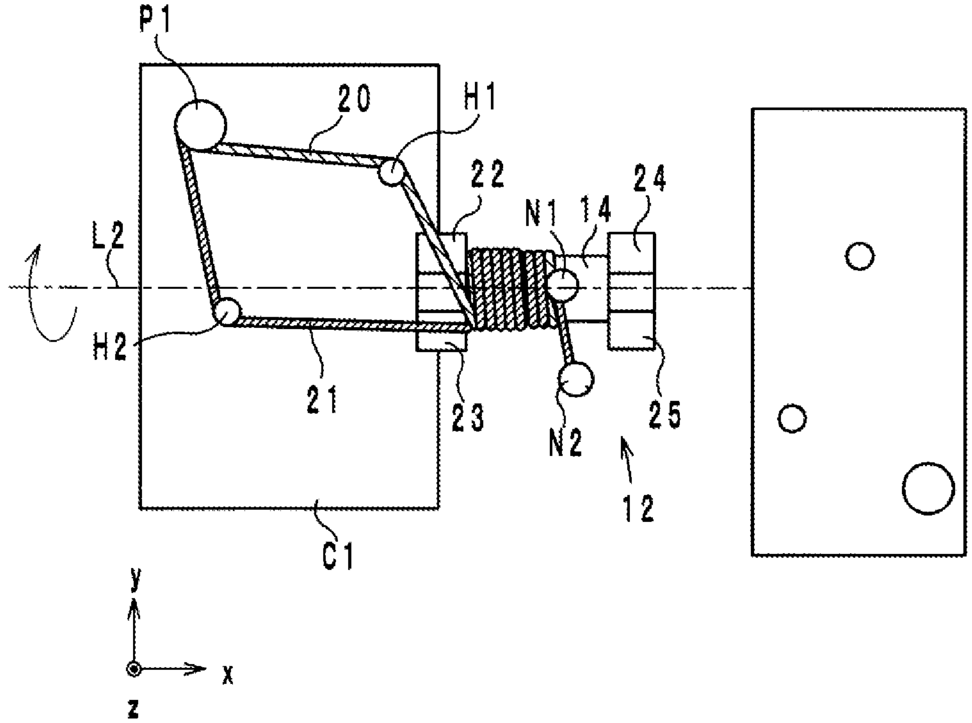
FIG. 15 is a view showing the step (fourth step) of manufacturing the common-mode choke coil according to one embodiment.

Next, the nozzle N2 is moved. To be more specific, as shown in FIG. 14 and FIG. 15, the nozzle N2 is moved to a negative direction side in the y axis direction with respect to the core 12 from a position in the vicinity of the center axis L2. At this stage of operation, the nozzle N2 is positioned on a positive direction side in the x axis direction with respect to the nozzle N1. With such a configuration, the winding 21 is pressed to the winding core portion 14 and, at the same time, the winding 20 is pressed to the winding core portion 14 with the winding 21 interposed between the winding 20 and the winding core portion 14.

Then, the chuck C1 is rotated by approximately five times while moving the nozzles N1, N2 to a positive direction side in the x axis direction. With such an operation, the winding 21 is directly wound on the winding core portion 14 and, at the same time, the winding 20 is wound on the winding core portion 14 with the winding 21 interposed between the winding 20 and the winding core portion 14. In this step, by rotating the chuck C1 five times, a state is brought about where the windings 20, 21 are wound on the winding core portion 14 twelve times as shown in FIG. 2 (fourth step is finished).

Figure 16:
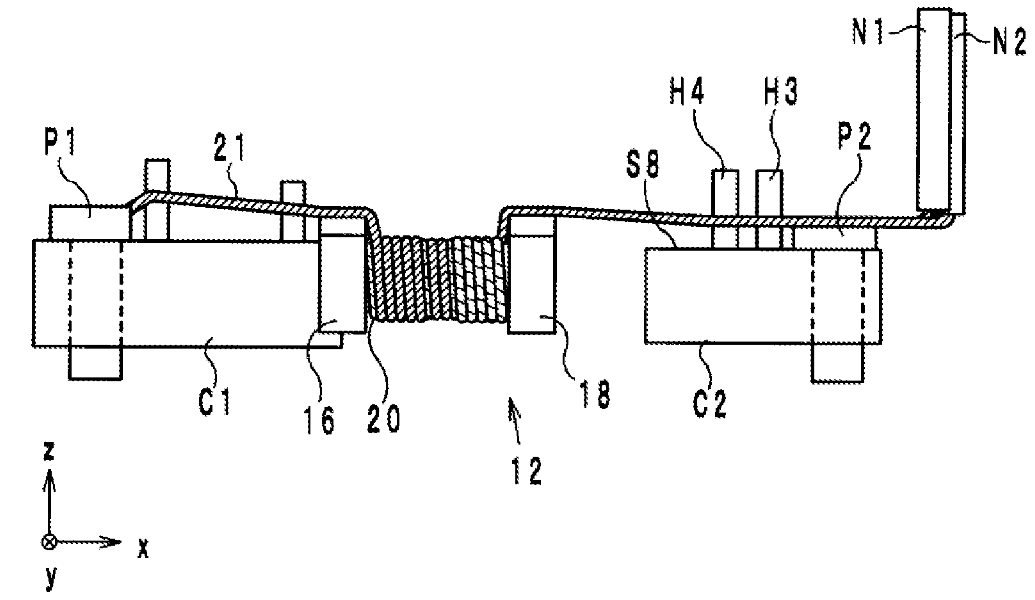
FIG. 16 is a view showing a step of manufacturing the common-mode choke coil according to one embodiment.
Figure 17:
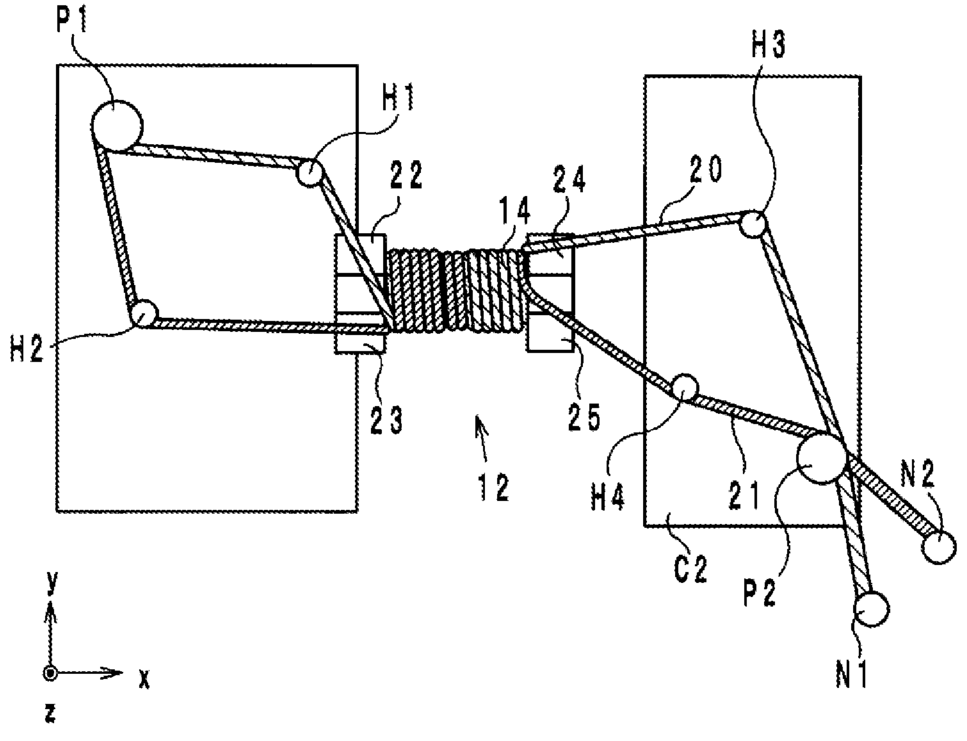
FIG. 17 is a view showing a step of manufacturing the common-mode choke coil according to one embodiment.

Next, as shown in FIG. 16 and FIG. 17, the winding 20 is hooked on a rod-like hooking pin H3 which is mounted on a guide member C2 disposed on a side opposite to the chuck C1 with the core 12 interposed between the guide member C2 and the chuck C1. To be more specific, the hooking pin H3 is disposed on a positive direction side in the x axis direction and on a positive direction side in the y axis direction with respect to the core 12. By bringing the winding 20 into contact with a side surface of the hooking pin H3 on a positive direction side in the y axis direction disposed as described above, the nozzle N1 which supplies the winding 20 is moved to a positive direction side in the x axis direction and to a negative direction side in the y axis direction. Then, the winding 20 is clamped by the wire clamp P2 mounted on the guide member C2.

In parallel with the operation of hooking the winding 20 on the hooking pin H3, the winding 21 is hooked on a rod-like hooking pin H4 mounted on the guide member C2. To be more specific, the hooking pin H4 is disposed on a positive direction side in the x axis direction and on a negative direction side in the y axis direction with respect to the core 12. By bringing the winding 21 into contact with a side surface of the hooking pin H4 disposed as described above on a negative direction side in the y axis direction, the nozzle N2 is moved to a positive direction side in the x axis direction and to a negative direction side in the y axis direction. Then, the winding 21 is clamped by the wire clamp P2. With such operations, the step of winding the windings 20, 21 on the winding core portion 14 of the core 12 is finished. In the above-mentioned winding step, the relative positional relationship between the winding 20 and the winding 21 in the x axis direction is reversed and hence, the winding 20 and the winding 21 intersect with each other. This intersection is performed on a surface of the winding core portion 14 on an external electrode side where the windings 20, 21 are pulled out, that is, on the surface S3 of the winding core portion 14.

After the winding of the windings 20, 21 is finished, the windings 20, 21 are connected to the external electrodes 22 to 25. To be more specific, in a state where the windings 20, 21 are brought into contact with the external electrodes 22, 23 on the flange portion 16, a heater chip is brought into pressure contact with the flange portion 16. With such an operation, the windings 20, 21 are pressure-bonded to the external electrodes 22, 23, respectively. Then, surplus portions of the windings 20, 21 which project to the outside of the core 12 from the flange portion 16 are cut. Then, the windings 20, 21 are brought into contact with the external electrodes 24, 25 on the flange portion 18, and the heater chip is brought into pressure contact with the flange portion 18. Finally, by cutting the surplus portions of the windings 20, 21 which project to the outside of the core 12 from the flange portion 18, the common-mode choke coil 1 is completed.

Advantageous Effect

In the common-mode choke coil 1, as shown in FIG. 2, the winding 20 is wound on the winding core portion 14 such that the winding 20 is positioned on a negative direction side in an x axis direction with respect to the winding 21 at the same turn as the winding 20 in the winding start side region α, and the winding 20 is wound on the winding core portion 14 with the winding 21 interposed between the winding 20 and the winding core portion 14 in the winding finish side region β. The winding 21 is wound on the winding core portion 14 such that the winding 21 is positioned on a positive direction side in the x axis direction with respect to the winding 20 at the same turn as the winding 21 in the winding finish side region β, and the winding 21 is wound on the winding core portion 14 with the winding 20 interposed between the winding 21 and the winding core portion 14 in the winding start side region α. Accordingly, to compare a positional relationship of the windings 20, 21 in the winding start side region α and a positional relationship of the windings 20, 21 in the winding finish side region β to each other without distinguishing the winding 20 and the winding 21 with respect to an axis of symmetry L1 which passes a middle point M of a segment which connects the winding start side region α and the winding finish side β on the winding core portion 14 and is orthogonal to the winding core portion, the positional relationship of the windings in the winding start side region α and the positional relationship of the windings in the winding finish side region β are symmetrical to each other. With such a configuration, in the common-mode choke coil 1, it is possible to suppress a mode conversion which occurs due to the difference in positional relationship of windings between the winding start side region α and the winding finish side region β.

Further, in the common-mode choke coil 1, the number of turns of the winding 20 and the number of turns of the winding 21 are equal. That is, in both windings 20, 21, the number of turns is 12. Still further, the number of winding times that the winding 20 is wound on the winding core portion 14 in a state where the winding 20 is brought into contact with the winding core portion 14 and the number of winding times that the winding 21 is wound on the winding core portion 14 in a state where the winding 21 is brought into contact with the winding core portion 14 are also equal. That is, in both windings 20, 21, the number of winding times that the winding is wound on the winding core portion in contact with the winding core portion is seven times. In other words, a length that the winding 20 is wound on the winding core portion 14 is equal to a length that the winding 21 is wound on the winding core portion 14. Accordingly, in the common-mode choke coil 1, it is possible to suppress a mode conversion which occurs due to the difference in length between windings which are wound on the winding core portion 14.

Further, in the common-mode choke coil 1, the windings 20, 21 intersect with each other on a surface S3 of the winding core portion 14. In this embodiment, the number of turns of the winding 20 and the number of turns of the winding 21 are 12, that is, an even number respectively. In this manner, when the number of turns is an even number, by making the windings 20, 21 intersect with each other on the surface of the winding core portion on an external electrode side to which the windings 20, 21 are pulled out, it is possible to make the lengths of the winding 20 and the winding 21 wound on the winding core portion 14 equal to each other.

Figure 18:
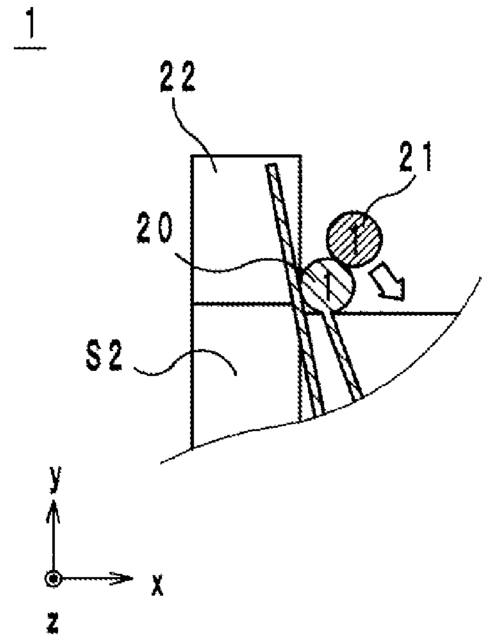
FIG. 18 is a view showing a defect which occurs when a winding method of windings is changed from a winding method used in a method of manufacturing a common-mode choke coil according to this embodiment (comparison example).

In the manufacture of the common-mode choke coil 1, assuming that the windings 20, 21 are simultaneously wound on the winding core portion 14 without winding the winding 20 on the winding core portion 14 preceding the winding 21 by one time, as shown in FIG. 18, there is a possibility that the winding 21 which is wound on the winding 20 falls or steps down from the winding 20 (hereinafter, referred to as "step-down"). On the other hand, in an actual method of manufacturing the common-mode choke coil 1, the winding 20 is wound on the winding core portion 14 one time and, thereafter, the windings 20, 21 are wound on the winding core portion 14. In this manner, by winding the winding 20 on the winding core portion 14 preceding the winding 21 by one time, winding is performed such that the winding 21 is fitted into a groove formed by the N-th turn and the (n+1)th turn of the winding 20. With such a configuration, in the method of manufacturing the common-mode choke coil 1, it is possible to prevent the step-down of the winding 21.

Figure 19:
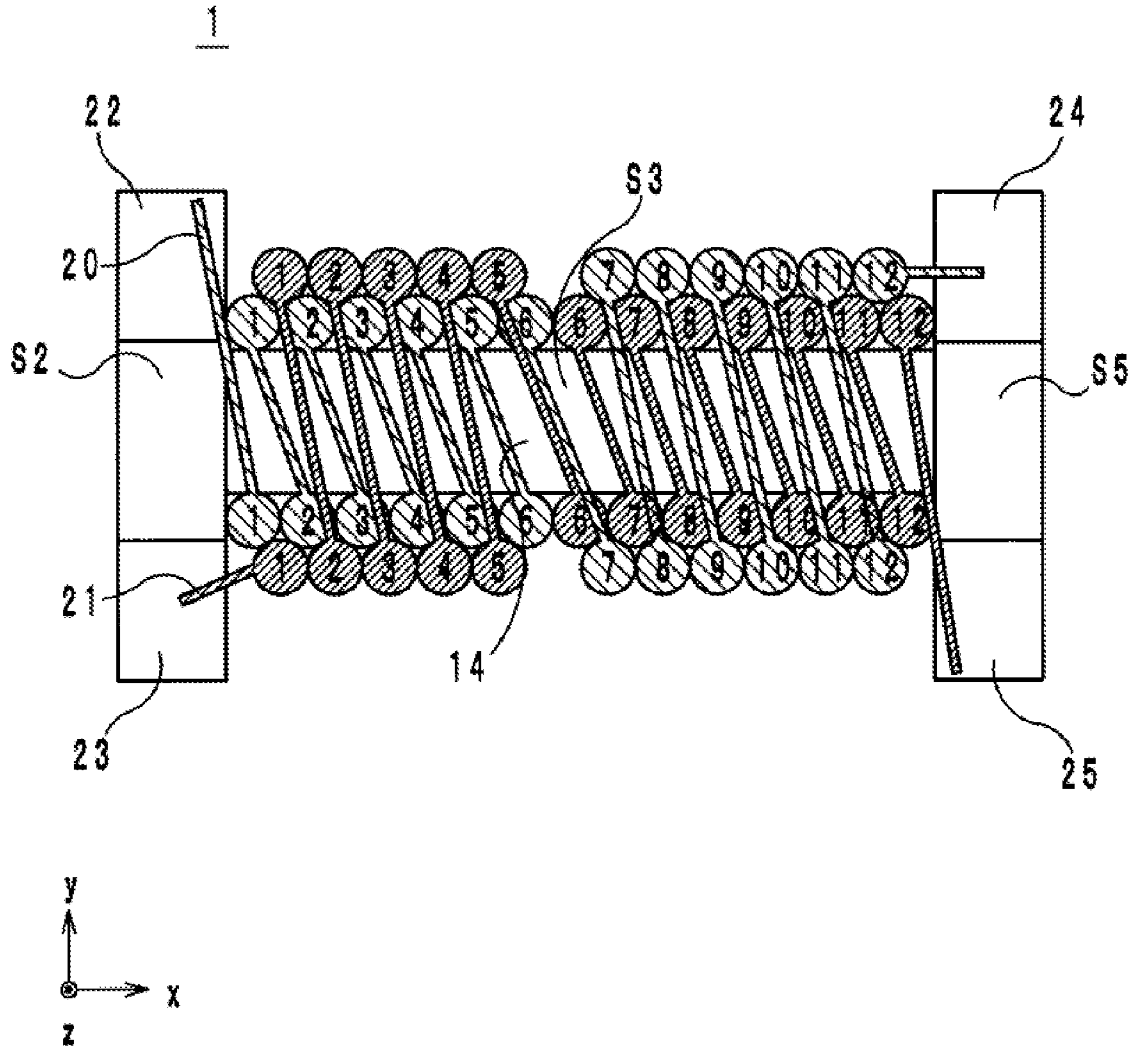
FIG. 19 is a schematic view showing a winding state of the windings of the common mode choke obtained when the winding method of windings according to the method of manufacturing a common-mode choke coil according to this embodiment is partially changed.

In the method of manufacturing the common-mode choke coil 1, after the second step is finished, the winding 21 is directly wound on the winding core portion 14 two times, and the winding 20 is directly wound on the winding core portion 14 one time and, thereafter, processing advances to the fourth step. Such a step is performed so as to make the positional relationship of the windings symmetrical between a negative direction side and a positive direction side of the x axis direction in the regions where the windings 20, 21 are wound when the numbers of turns of windings of the common-mode choke coil are even. To consider a case where the numbers of turns of the windings 20, 21 are set to twelve times as in the case of this embodiment and the processing advances to the fourth step immediately after the second step is finished, as shown in FIG. 19, the number of turns where the windings are wound doubly in either one of a negative direction side or a positive direction side in an x axis becomes larger than the number of turns where the windings are wound doubly in the other side. To the contrary, in the method of manufacturing the common-mode choke coil 1, the processing advances to the fourth step by directly winding the winding 21 on the winding core portion 14 two times and, subsequently, by directly winding the winding 20 on the winding core portion 14 one time after the second step is finished. Accordingly, it is possible to avoid the occurrence of a state where the number of turns where the windings are wound doubly in either one of the negative direction side or the positive direction side in the x axis becomes larger than the number of turns where the windings are wound doubly in the other side.

(First Modification)

The difference between the common-mode choke coil 1A according to a first modification and the common-mode choke coil 1 lies in the numbers of turns of the windings 20, 21 and the intersecting position of the windings 20, 21. The difference is specifically described hereinafter.

Figure 20:
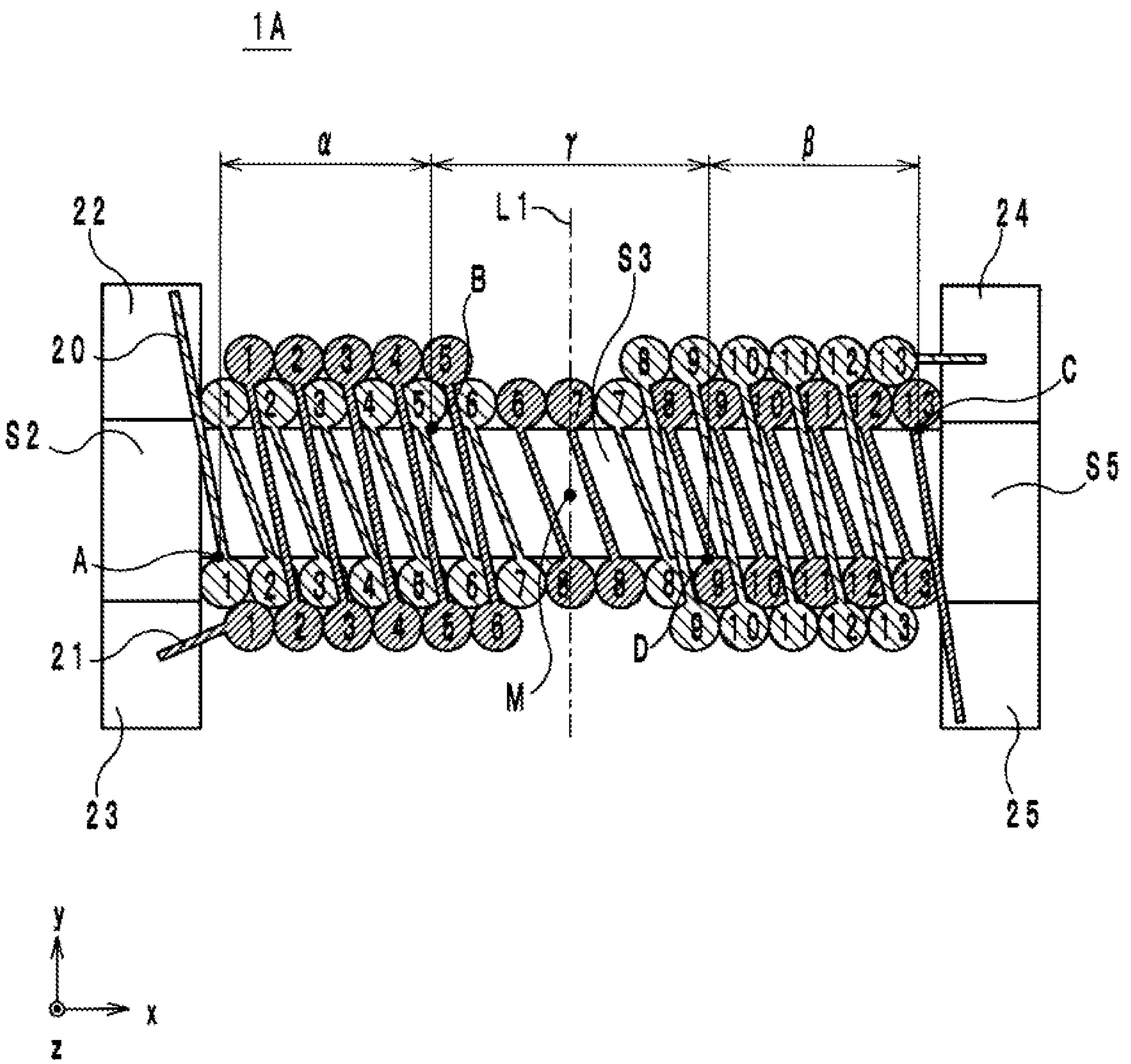
FIG. 20 is a schematic view showing a winding state of windings of a common-mode choke coil according to a modification.
Figure 21:
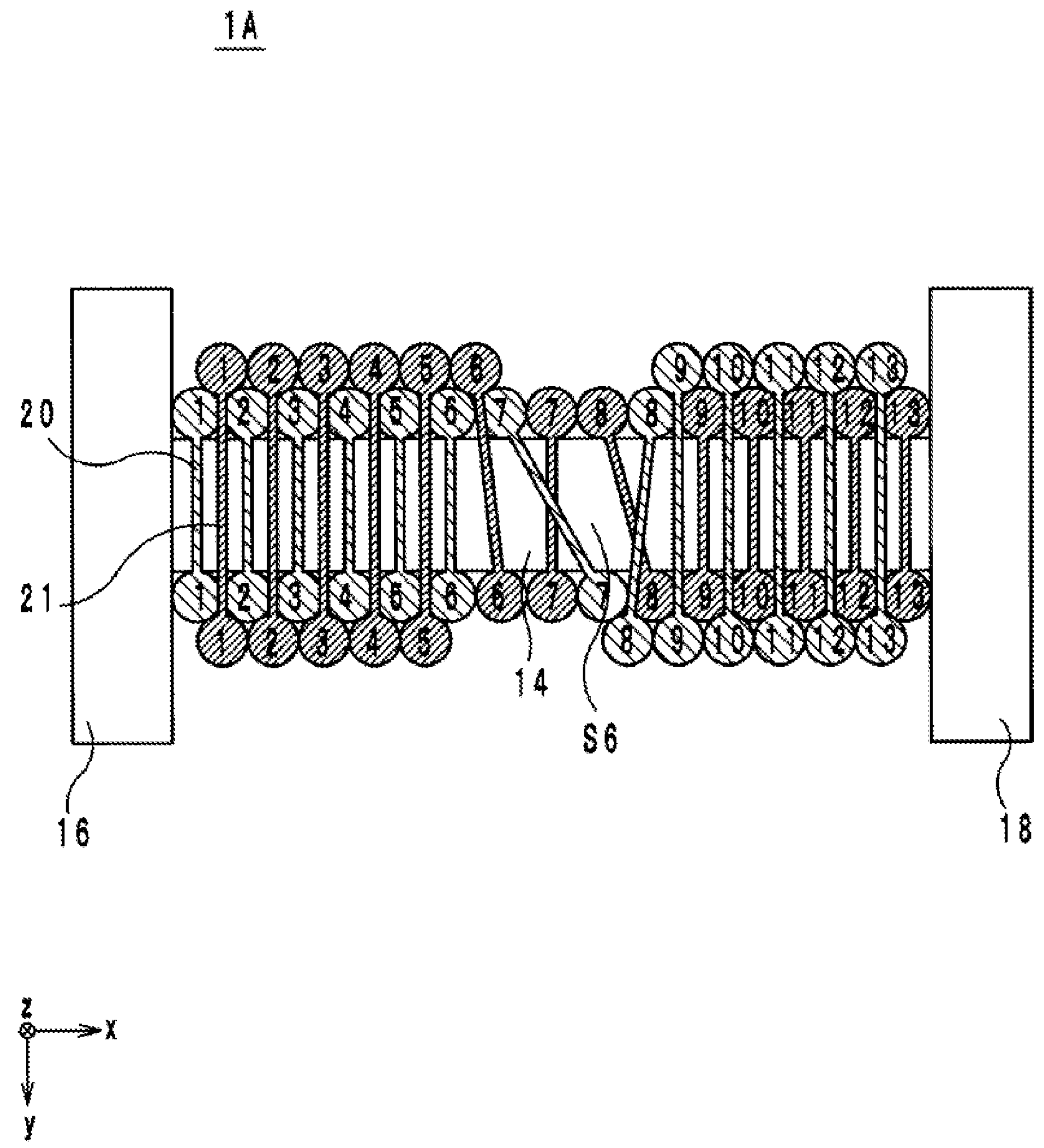
FIG. 21 is a schematic view showing a winding state of windings of a common-mode choke coil according to a modification.

As shown in FIG. 20, in the common-mode choke coil 1A, the total number of turns of the windings 20, 21 with respect to a winding core portion 14 are 13. The windings 20, 21 are wound on the winding core portion 14 in a state where the windings 20, 21 are in contact with the winding core portion 14 seven and half times. The windings 20, 21 intersect with each other within a center region γ ranging from a position B to a position D on the winding core portion 14. In this case, as shown in FIG. 21, the windings 20, 21 intersect with each other on a surface S6 of the winding core portion 14 on a negative direction side in a z axis direction.

In the common-mode choke coil 1A having the above-mentioned configuration, as shown in FIG. 20, to compare positional relationships of the windings 20, 21 in the winding start side region α and the positional relationship of the windings 20, 21 in the winding finish side region β to each other without distinguishing the winding 20 and the winding 21 with respect to an axis of symmetry L1 which passes a middle point M of a segment which connects the winding start side region α and the winding finish side β to each other on the winding core portion 14 and is orthogonal to the winding core portion 14, the positional relationship of the windings in the winding start side region α and the positional relationship of the windings in the winding finish side region β are symmetrical to each other. With such a configuration, in the common-mode choke coil 1A, it is possible to suppress a mode conversion which occurs due to the difference in positional relationship of the windings between the winding start side region α and the winding finish side region β.

Further, in the common-mode choke coil 1A, the number of turns of the winding 20 and the number of turns of the winding 21 are equal. That is, in both windings 20, 21, the number of turns is 13. Still further, the number of winding times that the winding 20 is wound on the winding core portion 14 in a state where the winding 20 is brought into contact with the winding core portion 14 and the number of winding times that the winding 21 is wound on the winding core portion 14 in a state where the winding 21 is brought into contact with the winding core portion 14 are equal. That is, in both windings 20, 21, the number of winding times that the winding is wound on the winding core portion in contact with the winding core portion is 7.5. In other words, a length that the winding 20 is wound on the winding core portion 14 is equal to a length that the winding 21 is wound on the winding core portion 14. Accordingly, in the common-mode choke coil 1A, it is possible to suppress a mode conversion which occurs due to the difference in length between the windings which are wound on the winding core portion.

Further, in the common-mode choke coil 1A, the windings 20, 21 intersect with each other on a surface S6 of the winding core portion 14. In this embodiment, the number of turns of the winding 20 and the number of turns of the winding 21 are 13, that is, an odd number, respectively. In this manner, when the number of turns is an odd number, by making the windings 20, 21 intersect with each other on the surface on a side opposite to a surface of the winding core portion on an external electrode side from which the windings 20, 21 are pulled out, it is possible to make a length that the winding 20 is wound on the winding core portion 14 and a length that the winding 21 is wound on the winding core portion 14 equal to each other.

Other configurations and manner of operation and advantageous effects such as the prevention of "step-down" of the common-mode choke coil 1A according to this modification are substantially equal to the corresponding configurations and manner of operation and advantageous effects of the common-mode choke coil 1 according to the first embodiment.

(Second Modification)

Figure 22:
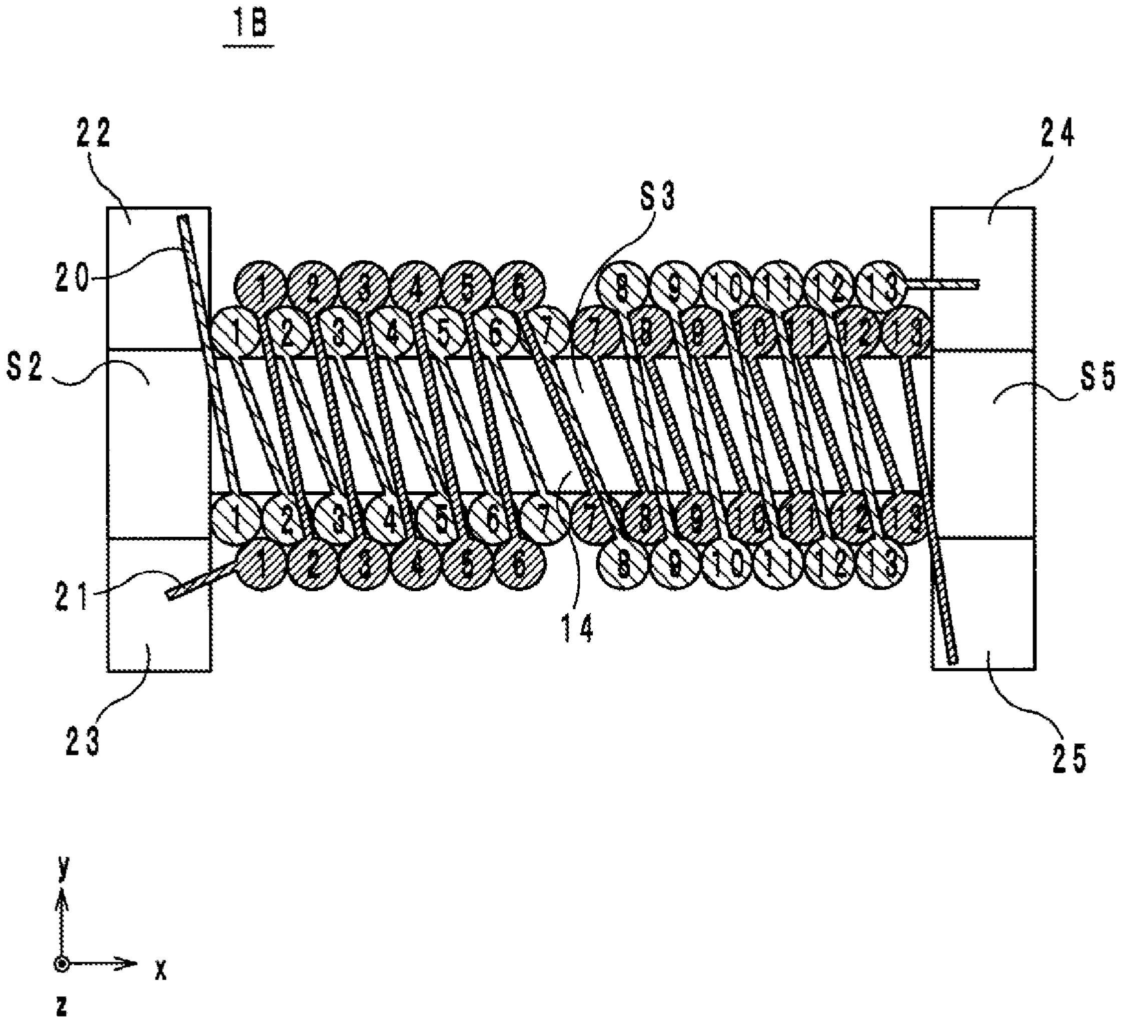
FIG. 22 is a schematic view showing a winding state of windings of the common mode choke obtained when the winding method of the windings according to the method of manufacturing a common-mode choke coil according to this modification is partially changed.
Figure 23:
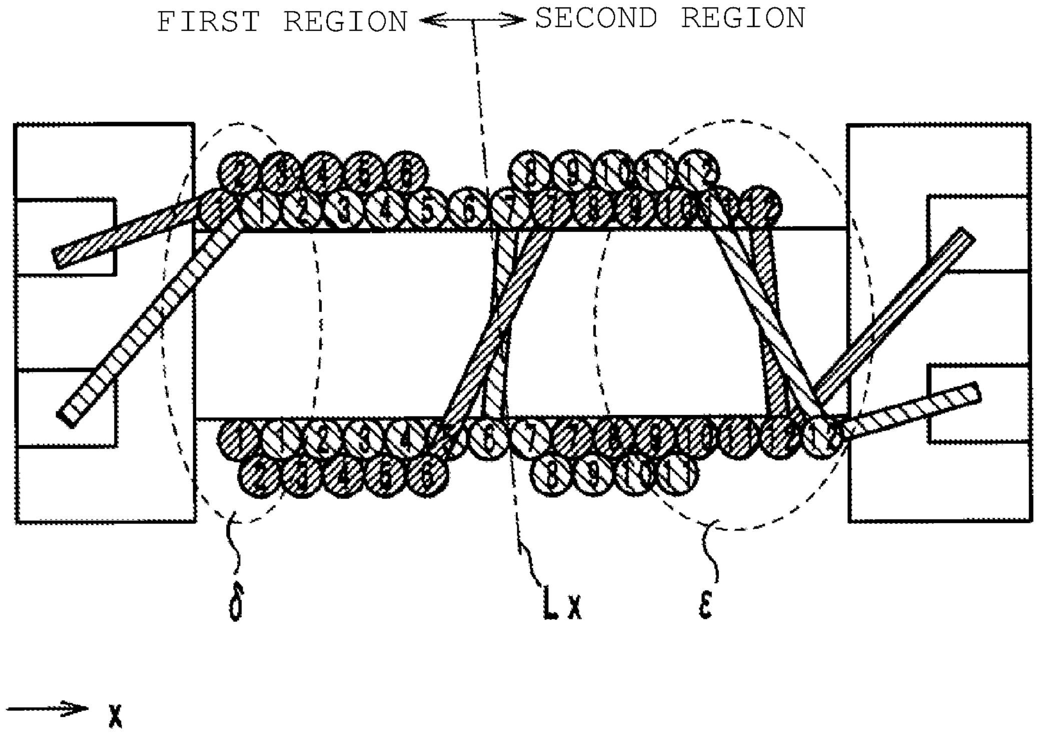
FIG. 23 is a schematic view showing a state where conductive wires are wound on a winding core portion of a conventional common-mode choke coil.

In a common-mode choke coil 1B according to a second modification, as shown in FIG. 22, a region where a winding 20 is wound on a winding core portion 14 with a winding 21 interposed between the winding 20 and the winding core portion 14 and a region where the winding 21 is wound on the winding core portion 14 with the winding 20 interposed between the winding 21 and the winding core portion 14 are set larger than corresponding regions of the common-mode choke coil 1A according to the first modification. With such a configuration, in a method of manufacturing a common-mode choke coil, this configuration can be acquired by performing the following method of manufacturing a common-mode choke coil 1B. That is, after a first step and a second step are finished, the winding 21 is directly wound on the winding core portion 14 one time in a third step and, thereafter, the processing advances to a fourth step.

Other configurations and manner of operation and advantageous effects of the common-mode choke coil 1B according to this modification are substantially equal to the corresponding configurations and manner of operation and advantageous effects of the common-mode choke coil 1A according to the first modification.

Other Embodiments

The common-mode choke coil and the method of manufacturing such a common-mode choke coil according to the present disclosure are not limited to those described in the embodiments, and various modifications are conceivable without departing from the gist of the present disclosure. For example, the number of turns of windings and shapes, materials and the like of the winding core portion and the flange portions in the core can be set as desired. Further, the middle point M which connects the winding start side region α and the winding finish side region β to each other in an x axis direction may not agree with a middle point of the winding core portion 14. Further, constitutions of the respective embodiments may be combined with each other.

INDUSTRIAL APPLICABILITY

As has been described heretofore, the present disclosure is usefully applicable to a common-mode choke coil and a method of manufacturing a common-mode choke coil, and the common-mode choke coil to which the present disclosure is applied is excellent in suppressing the occurrence of the mode conversion.

DESCRIPTION OF REFERENCE SYMBOLS

A: one end portion of winding which is brought into contact with winding core portion (first end portion)

C: the other end portion of winding which is brought into contact with winding core portion (second end portion)

B: winding position in front of center of winding core portion as viewed from first end portion among windings which are in contact with winding core portion (first position)

D: winding position in front of center of winding core portion as viewed from second end portion among windings which are in contact with winding core portion (second position)

The invention claimed is:

1. A common-mode choke coil comprising:

a core extending in an axial direction and having a winding core portion which includes a first region and a second region;

a first winding wound on the winding core portion; and a second winding wound on the winding core portion in a state where the second winding runs parallel to the first winding, wherein the first region covers an area from a first end portion on one side of a portion of the first winding which is brought into contact with the winding core portion to a first position disposed in front of a center of the winding core portion, the second region covers an area from a second end portion on the other side of a portion of the second winding which is brought into contact with the winding core portion to a second position disposed in front of the center of the winding core portion, the first winding is wound on the winding core portion such that the first winding is positioned on the one side with respect to the second winding of same turns as the first winding in the first region and the first winding sandwiches the second winding in the second region, the second winding is wound on the winding core portion such that the second winding is positioned on the other side with respect to the first winding of same turns as the second winding in the second region and the second winding sandwiches the first winding in the first region, the number of turns of the first winding and the number of turns of the second winding are equal to each other, the number of winding times that the first winding is wound in a state where the first winding is brought into contact with the winding core portion and the number of winding times that the second winding is wound in a state where the second winding is brought into contact with the winding core portion are equal to each other, the first winding at an inner position is connected to a first external electrode and located further from the first external electrode than a second external electrode, the first winding at an outer position is connected to a third external electrode and located closer to the third external electrode than a fourth external electrode, the second winding at the inner position is connected to the fourth external electrode and located further from the fourth external electrode than the third external electrode, the second winding at the outer position is connected to the second external electrode and located closer to the second external electrode than the first external electrode, and with respect to a same turn number of the first winding and the second winding, the first winding and the second winding switch vertically but do not switch laterally, such that in the first region, the first winding is at the inner position and closer to a first end of the winding core portion in an axial direction of the winding core portion than the second winding, and in the second region, the first winding is at the outer position and remains closer to the first end of the winding core portion than the second winding.

2. The common-mode choke coil according to claim 1, wherein the core has a first flange portion mounted on the first end of the winding core portion in the axial direction of the winding core portion and a second flange portion mounted on a second end of the winding core portion opposite to the first end in the axial direction of the winding core portion, the first external electrode and the second external electrode are mounted on a surface of the first flange portion positioned in a first direction among directions orthogonal to the axial direction, and the third external electrode and the fourth external electrode are mounted on a surface of the second flange portion positioned in the first direction, the number of turns of the first winding and the number of turns of the second winding are an even number, and the first winding and the second winding intersect with each other on a surface of the winding core portion positioned in the first direction as viewed from the first direction.

3. The common-mode choke coil according to claim 1, wherein the core has a first flange portion mounted on the first end of the winding core portion in the axial direction of the winding core portion and a second flange portion mounted on a second end of the winding core portion opposite to the first end in the axial direction of the winding core portion, the first external electrode and the second external electrode are mounted on a surface of the first flange portion positioned in a first direction among directions orthogonal to the axial direction, and the third external electrode and the fourth external electrode are mounted on a surface of the second flange portion positioned in the first direction, the number of turns of the first winding and the number of turns of the second winding are an odd number, and the first winding and the second winding intersect with each other on a surface of the winding core portion positioned in a second direction which is a direction opposite to the first direction as viewed from the direction opposite to the first direction.

* * * * *